United States Patent
Lyons

(10) Patent No.: US 7,778,904 B1
(45) Date of Patent: Aug. 17, 2010

(54) METHOD FOR PROVIDING AN AFFORDABLE HOUSING COLLATERALIZATION POOL

(76) Inventor: John E. Lyons, 14120 Eagle Run Dr., Omaha, NE (US) 68164

(*) Notice: Subject to any disclaimer, the term of this patent is extended or adjusted under 35 U.S.C. 154(b) by 1118 days.

(21) Appl. No.: 11/288,557

(22) Filed: Nov. 29, 2005

Related U.S. Application Data

(60) Provisional application No. 60/631,467, filed on Nov. 29, 2004.

(51) Int. Cl.
*G06Q 40/00* (2006.01)
(52) U.S. Cl. .......................... 705/35; 705/38
(58) Field of Classification Search .............. 705/1–50; 257/E21.133, E21.197; 385/65
See application file for complete search history.

(56) References Cited

U.S. PATENT DOCUMENTS

| | | | | |
|---|---|---|---|---|
| 6,601,033 | B1* | 7/2003 | Sowinski | 705/1 |
| 2002/0026419 | A1* | 2/2002 | Maritzen et al. | 705/41 |
| 2003/0187777 | A1* | 10/2003 | Kochansky et al. | 705/37 |

OTHER PUBLICATIONS

William B. Shear, Mortgage Financing: Seller-Funded Down-Payment Assistance Changes the Structure of the Purchase Transaction and Negatively Affects Loan Performance, Jun. 22, 2007, United States Government Accountability Office, web, 1-12.*

* cited by examiner

*Primary Examiner*—James P Trammell
*Assistant Examiner*—Marissa Liu
(74) *Attorney, Agent, or Firm*—Suiter Swantz pc llo

(57) ABSTRACT

The present invention is a method for providing a low cost source of mortgage funding to sub-prime borrowers which reduces the desire of quality sub-prime borrowers to leave the mortgage pool. A lender may receive an amount of money from a financial institution in the form of a borrowing instrument. A lender may deliver an amount of money in the form of a collateralization loan to a housing agency. Housing agency may invest loan in one or more financial products, such as lender underwritten insurance policies. Housing agency may deliver individual mortgage loan recommendations to lender. Lender may borrow funds used in the collateralization loan by selling the interest bearing borrowing instrument to a financial institution. Lender may also sell individual mortgage loans to one or more government sponsored entities. From these financial products, borrowing instruments, and individual mortgages, mortgage funding may be provided to sub-prime borrowers.

14 Claims, 4 Drawing Sheets

Guaranteed Investment Contract
Income Analysis
(000's omitted)

| Duration | (1) Annual GIC Expense[1] | (2) Coupon Strip Income[2] | (3) COLI Income[3] | (4) Annual Difference |
|---|---|---|---|---|
| 1 | (1,100) | 1,250 | 186 | 336 |
| 2 | (2,200) | 2,500 | 379 | 679 |
| 3 | (3,300) | 3,738 | 577 | 1,015 |
| 4 | (4,400) | 4,950 | 782 | 1,332 |
| 5 | (5,500) | 6,125 | 993 | 1,618 |
| 6 | (6,600) | 7,250 | 1,209 | 1,859 |
| 7 | (6,600) | 8,313 | 1,232 | 2,945 |
| 8 | (6,600) | 9,300 | 1,252 | 3,952 |
| 9 | (6,600) | 10,200 | 1,269 | 4,869 |
| 10 | (6,600) | 11,000 | 1,282 | 5,682 |
| 11 | (6,600) | 11,688 | 1,294 | 6,381 |
| 12 | (6,600) | 12,375 | 1,302 | 7,077 |
| 13 | (6,600) | 13,063 | 1,309 | 7,771 |
| 14 | (6,600) | 13,750 | 1,312 | 8,462 |
| 15 | (6,600) | 14,438 | 1,313 | 9,150 |
| 16 | (6,600) | 15,125 | 1,311 | 9,836 |
| 17 | (6,600) | 15,813 | 1,305 | 10,518 |
| 18 | (6,600) | 16,500 | 1,296 | 11,196 |
| 19 | (6,600) | 17,188 | 1,284 | 11,872 |
| 20 | (6,600) | 17,875 | 93,067 | 104,342 |

[1] Annual GIC rate of Libor plus 50 b.p.
[2] Assumes 125 b.p. @ 10% prepayment speed
[3] Represents 100 b.p. of COLI contract accumulated value. (Investment management fees, mortality and expense fees and policy administration fees.) Includes Insurance Company funds recovered in year 20.

5.00% :Libor Rate
5.50% :GIC Interest Rate
6.00% :SVAF Crediting Rate

FIG. 3B

METHOD FOR PROVIDING AN AFFORDABLE HOUSING COLLATERALIZATION POOL

CROSS-REFERENCE TO RELATED APPLICATIONS

The present application claims the benefit under 35 U.S.C. §119 of U.S. Provisional Application No. 60/631,467, filed on Nov. 29, 2004. Said U.S. Provisional Patent Application No. 60/631,467 is hereby incorporated by reference in its entirety.

FIELD OF THE INVENTION

The present invention relates generally to providing mortgages for borrowers, and more particularly to a method for providing mortgages for higher risk borrowers while more effectively managing lender credit risk.

BACKGROUND OF THE INVENTION

Home ownership is one of the most important aspects of life for many people. Home ownership is generally made possible through a mortgage whereby a lender acquires a conveyance of a property from a borrower as security for a loan to purchase the property. Upon payment of the mortgage according to stipulated terms, the conveyance is void and the borrower is the owner of the property.

Mortgages may be typically classified into two categories, prime, or conforming loans, and sub-prime, or non-conforming loans. Classification is typically based upon a borrower's income level, credit rating, and the borrower's ability to make a down payment for the mortgage. Under a prime mortgage loan, the borrower gives the lender a mortgage in exchange for money to purchase property. The lender typically requires the borrower to purchase mortgage insurance if the loan-to-value ratio is greater than 80 percent. This protects a lender by allowing the lender to sell the mortgage in the secondary market. Such a secondary market may be created so that primary mortgages can be bought and traded by investors, allowing initial lenders to remove the mortgages from its books.

A sub-prime mortgage loan may be offered to those borrowers who may not qualify for a prime mortgage loan. However, a problem associated with offering sub-prime mortgage loans is inefficient pricing of the sub-prime mortgage loans. Specifically, efficient pricing of sub-prime mortgage loans may be difficult due to higher default and severity rates. Default and severity rates refer to the anticipated amount of homebuyers that will fail to fulfill their payment obligations, and the percentage of money a lender may lose on each of those mortgages, respectively. Higher default and severity rates often cause lending institution to charge higher interest rates on sub-prime mortgages than the interest rates offered for prime mortgage loans.

Sub-prime mortgage loans are often packaged and offered to mortgage finance companies in bulk of redistribution to sub-prime borrowers. A collection of borrowers with sub-prime mortgage loans may be referred to as a mortgage pool. Since a borrower with a sub-prime mortgage loan may develop a better credit rating, the borrower may refinance with a prime mortgage loan to obtain a reduced interest rate for the remainder of the payment obligation. The anticipated exit of quality borrowers from the collection of borrowers with sub-prime mortgage loans causes a lending institution to charge an even higher initial mortgage rate for sub-prime mortgage loans in the mortgage pool. Increasing interest rates to account for the loss of quality borrowers from the mortgage pool causes the development of a cyclical pattern of quality borrowers leaving the mortgage pool, and lenders increasing mortgage interest rates. This cycle is known as turning a mortgage pool toxic, because eventually only the borrowers that cannot qualify for a conforming loan, the highest risk borrowers, remain in the mortgage pool.

Despite the volatile and risky environment surrounding the provision of sub-prime mortgage loans, there is considerable pressure from government agencies on lending institutions and government sponsored entities to issue an increasing number of these mortgage loans. This pressure stems from enactment of the Community Reinvestment Act (CRA). The CRA is intended to encourage depository institutions to help meet the credit needs of the communities in which they operate, including low- and moderate-income neighborhoods, consistent with safe and sound banking operations. The CRA requires that each insured depository institution's record in helping meet the credit needs of its entire community be evaluated periodically. As a policing authority, the act established regulatory agencies for monitoring and grading banks on their level of lending, investment, and providing services to low- and moderate-income (LMI) neighborhoods. The federal agencies conducting CRA examinations include the Office of the Comptroller of the Currency that examines nationally chartered banks, the Office of Thrift Supervision that examines savings and loan institutions, and the Federal Deposit Insurance Corporation and the Federal Reserve Board, both of which examine state chartered banks. With respect to mortgage loans, the CRA is dedicated to the increased provision of loans to LMI borrowers, who often only qualify for sub-prime mortgages. However, as stated previously, profitable pricing of LMI mortgage loans to account for higher default rates and loss severity continues to be difficult. The practical problem realized by banks in their efforts to meet CRA performance requirements is that a relatively high percentage of loans made to sub-prime borrowers result in default. Nevertheless, in order to maintain a satisfactory CRA rating, banks are obliged to assume the risk of non-payment. The possibility of higher losses may cause banks to be reluctant in supporting community development projects.

Additionally, the relationship between various housing agencies seeking to provide low- to moderate-income housing and lending institutions may be tense, as these parties often have conflicting interests. A housing agency may be a public housing authority that may be primarily responsible for housing, urban and community development programs, and other related programs. A housing agency may be an agency organized under the US Department of Housing and Urban Development (HUD). These agencies are typically not-for-profit agencies whose primary activity may be the insuring of residential mortgage loans made by private lenders. By providing mortgage insurance to lenders to cover most losses that may occur when a borrower defaults a housing agency may encourage lenders to make loans to borrowers who might not qualify for conventional mortgages. However, these agencies often have limited funding and restrictive budgets, preventing them from meeting all of their affordable housing goals and placing them in conflict with lending institutions. For example, a housing agency may desire to increase the number of LMI mortgage loans issued, whereas a lending institution may desire to keep its credit risk to a minimum. This tension further exacerbates the problem of locating quality LMI borrowers and providing mortgage loans to these borrowers at rates competitive enough to prevent them from exiting the mortgage pool.

Consequently, a method of providing lower cost mortgage funding to sub-prime borrowers is necessary.

SUMMARY OF THE INVENTION

Accordingly, the present invention is directed to a novel method for providing a low cost source of mortgage funding to sub-prime borrowers which reduces the desire of quality sub-prime borrowers to leave the mortgage pool. In an embodiment of the invention, the method may include providing a loan at a below market rate to a party such as a housing agency. A lender may receive funds from a financial institution in the form of a borrowing instrument. A lender may be provided with income via a financial structure by requiring the party to invest the loan proceeds in a financial product that is responsive to a varying interest rate environment. A lender may be reimbursed for defaults suffered in the mortgage pool by the party's excess earnings from such an investment. The party may retain the excess earnings not used to reimburse the defaults to fund a party's operations. As the financial structure matures, a lender may forgive the original loan balance and any interest due over a period of time, eliminating or substantially reducing repayment of the loan by the party. This may allow a lender to shelter income generated from originating low-to-moderate income (LMI) mortgages.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 3A and 3B depict an exemplary example of providing a collateralization loan in accordance with an embodiment of the present invention.

DETAILED DESCRIPTION OF THE INVENTION

Reference will now be made in detail to a presently preferred embodiment of the invention, an example of which is illustrated in the accompanying drawings.

Figure 1:
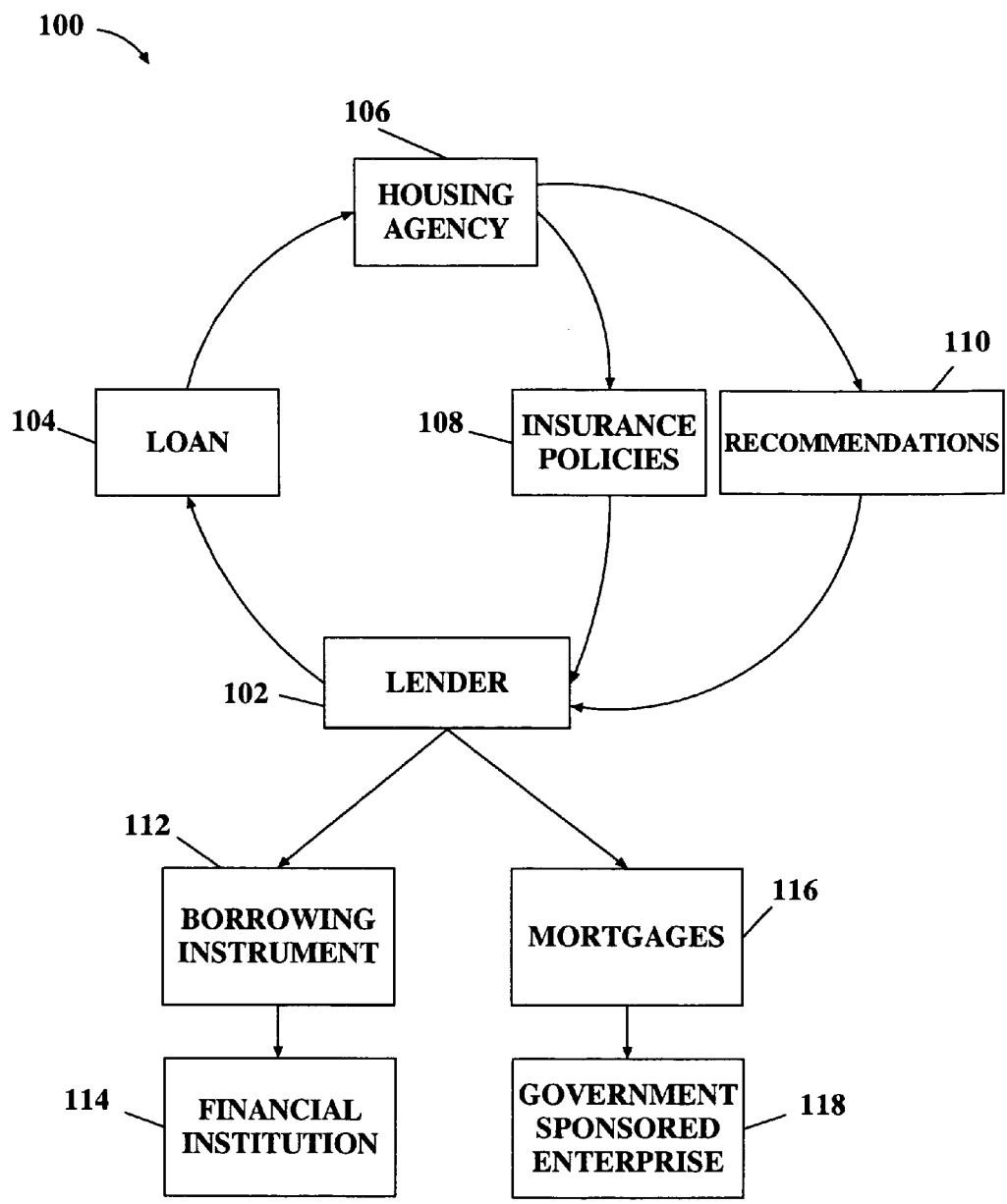
FIG. 1 depicts a schematic diagram illustrating a process for providing mortgage loans in accordance with an embodiment of the present invention.

Referring to FIG. 1, a schematic diagram illustrating the process 100 of providing mortgage loans in accordance with the present invention is shown. A lender 102 may deliver an amount of money in the form of a loan 104 to a party such as a not-for profit housing agency 106. Loan 104 may be a collateralization loan. Lender 102 may be a bank, insurance company, or any other financial investment entity capable of loaning funds and/or providing a borrowing party with a financial investment structure that may be in the form of an equitable transfer of the risk of a potential loss in exchange for a fee. Lender 102 may leverage the financial structure by financing the collateralization loan by selling an interest-bearing borrowing instrument 112 to a financial institution 114. It is contemplated that the process 100 may include any party having an interest in providing mortgages or mortgage acquisition assistance to low-to-moderate-income borrowers. However, housing agencies, and more specifically, not-for-profit housing agencies, may be a primary party to which a lender 102 may make loans, and as such a party may be referred to specifically as a housing agency 106. Housing agency 106 may invest the collateralization loan 104 in lender underwritten insurance policies 108. Housing agency 106 may deliver individual mortgage loan recommendations 110 to lender 102. Lender 102 may issue individual mortgage loans 116. Individual mortgage loans 116 may be issued pursuant to recommendations 110. Alternatively, individual mortgage loans may be made utilizing criteria that may be independent from recommendations 110. Lender 102 may also sell the individual mortgages 116 to a government sponsored enterprise 118. From this process, mortgage funding may be provided to sub-prime borrowers. Advantageously, the process allows a lender to issue LMI mortgages that are both competitive with conforming loans and profitable for the lender, which may mitigate mortgage pool toxicity and eliminate much of the credit risk inherent in LMI mortgages.

Figure 2:
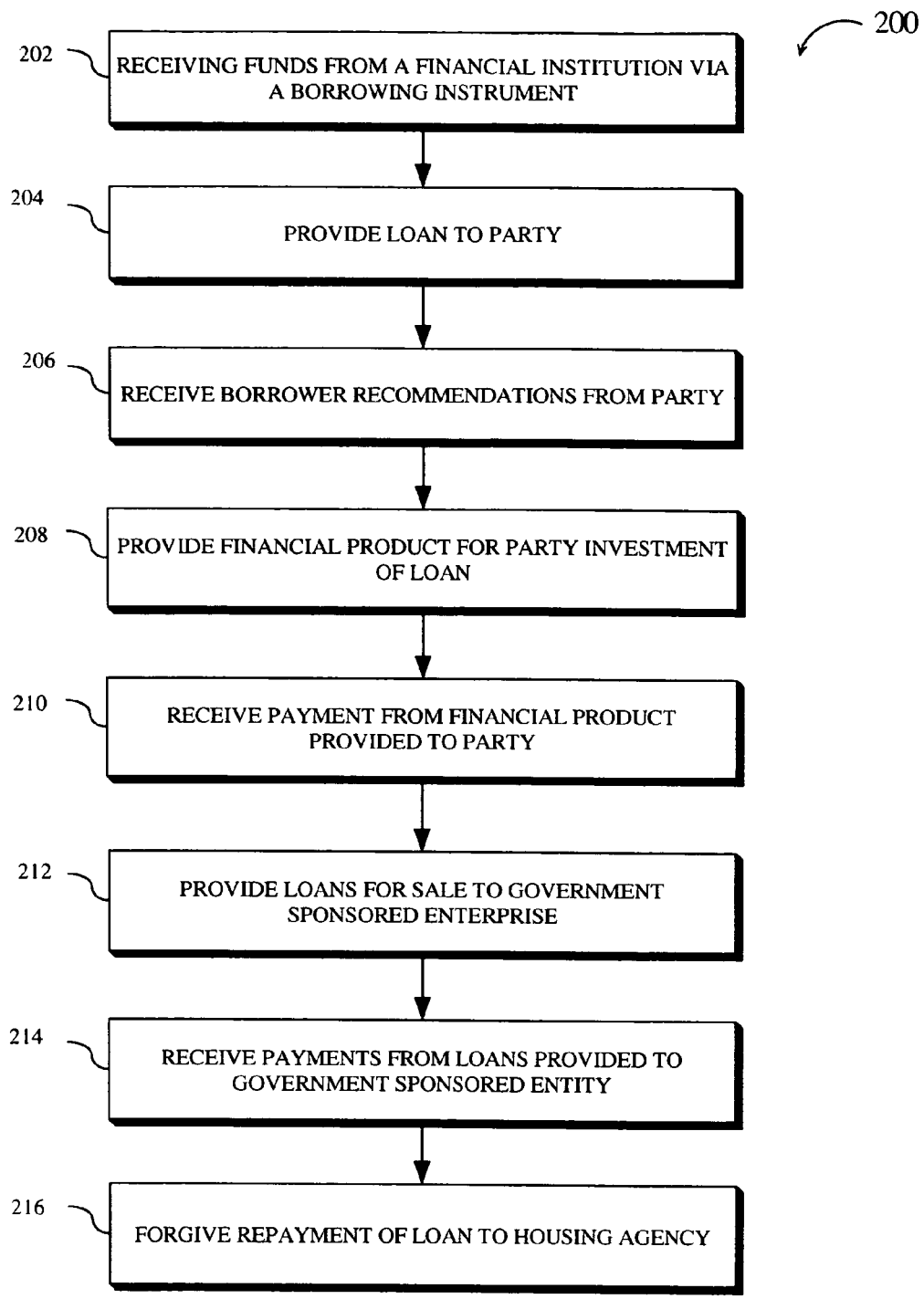
FIG. 2 depicts a flowchart representing a method for providing mortgages for higher risk borrowers in accordance with an embodiment of the present invention.

Referring to FIG. 2, a flowchart representing a method 200 for providing mortgages for higher risk borrowers in accordance with the present invention is shown. In an embodiment of the invention, the method may include a lender receiving funds from a financial institution such as a bank in exchange for a borrowing instrument 202. In a preferred embodiment, the borrowing instrument may be a Guaranteed Investment Contract (GIC). GICs may refer to secure investments that guarantee to preserve both an original investment and any interest earned on the investment. For example, an investment package may include investing a sum of money for a specific term, or period of time, and earning interest, at either a set or a variable rate, or based on a market-linked formula. At the end of that term, an investor such as a financial institution may be guaranteed to receive the full initial principal plus any interest income earned on the investment. In a preferred embodiment, GICs may be indexed to LIBOR. LIBOR may refer to London Interbank Offer Rate, and generally refers to a rate of interest at which banks offer to lend money to one another in wholesale money markets in London. LIBOR may be a standard financial index used in United States capital markets. Additionally, LIBOR may be an index that is utilized to set the cost of various variable-rate loans, including credit cards and adjustable-rate mortgages. Indexing an interest rate to LIBOR may refer to establishing a margin at a certain percentage above LIBOR. Such percentage may increase or decrease in accordance with movement in LIBOR. For example, a lender may borrow $20 million by issuing $20 million in GICs at a margin that may be established at a certain percentage above LIBOR. The rate may increase or decrease in accordance with movement in LIBOR. Lender may provide GICs to financial institutions that may be CRA qualified GICs.

A financial institution may be provided with a rate of return on each GIC purchased, and receive additional CRA credit for any LMI mortgages issued by a lender. For example, a financial structure may be provided for financial institutions for obtaining credit under the three CRA tests, potentially minimizing a financial institutions risk of sanctions for CRA violations. Current CRA regulations establish three different tests for lending institutions and a strategic plan option. Under each test, examiners may rate banks according to their lending records and responsiveness to community needs. Banks may receive a score based on their evaluations of "outstanding", "satisfactory", "needs improvement", or "substantial noncompliance." The last two scores may result in delays or denials of mergers, acquisitions, or expansions of services. As a result, a financial institution may be desirous of purchasing such CRA qualified GICs to receive a guaranteed rate of return on its investment and satisfy certain CRA requirements without a negative effect on a financial institutions balance sheet.

Method 200 may be further comprised of a lender providing a loan to a party such as a housing agency. Loan issued to a housing agency by lender may be a collateralization loan at a below market rate to a housing agency 204. Housing agency may be a not-for-profit (NFP) entity such as an NFP housing agency. Additionally, the housing agency may be chartered by a national coalition of organizations serving to promote LMI housing. A collateralization loan may be provided to housing agency pursuant to an agreement requiring the housing agency to invest the collateralization loan proceeds in a financial product. For example, a lender may issue a $20 million collateralization loan to a housing agency. The interest rate charged to the housing agency may be indexed to LIBOR. The effective interest rate charged to a housing agency may be zero or effectively zero, by indexing the interest rate a certain number of basis points below LIBOR.

Method 200 may be further comprised of the lender receiving borrower recommendations from the housing agency for qualified mortgages 206. The housing agency may review applications for LMI loans utilizing criteria set by the lender for approval of loan applicants and recommend qualified borrowers to a lender. Criteria for application approval may include standard factors such as borrower income, borrower job status, borrower credit rating, bank statements and the like, but may also include additional non-standard factors such as future income potential, lack of knowledge of the banking system, the possibility that a potential homebuyer may not utilize a bank or may have verifiable income not typically recognized by banks in the loan process, lack of credit history, other special circumstances that may have affected a borrower's credit rating but are no longer in force, and the like. Borrower recommendations may be determined by a computer implemented method for determining low risk mortgage loan candidates. Further, because housing agency employees may be able to develop more personal relationships with potential homebuyers, they may be able to perform a more fact specific inquiry to determine a borrower's credit worthiness. Lender may approve and accept qualified mortgages based upon a housing agency's recommendations. The mortgages may carry a coupon rate that is a set number of basis points over current market rates for conforming loans. Coupon rate refers generally to an amount that is the interest paid on individual loans underlying a package of loans. For example, mortgage coupon rate may be 125 basis points over market rate.

Method 200 may provide a financial product to a party such as a housing agency for investment of the collateralization loan by the housing agency 208. Financial product may act as credit enhancement for the individual mortgages issued to the recommended borrowers by a lender. In an embodiment, lender may underwrite a series of contracts for financial products whereby the lender may undertake to indemnify another or pay a specified amount upon determinable contingencies or any other such device for the transfer of the risks of the individual entities to the lender. In an embodiment of the invention, the financial product may be an insurance policy such as a life insurance policy. In a preferred embodiment, life insurance policy may be a Corporate Owned Life Insurance Policy (COLI). COLI life insurance policies may be purchased on borrowers recommended by a housing agency. The housing agency may invest the loan proceeds in a fund that is responsive to a varying interest rate environment such as a financial product managed by a lender. For example, a housing agency may invest the loan proceeds in COLI policies purchased on LMI borrowers. In this manner, investment of the loan proceeds by the housing agency may act as pool level credit enhancement on individual mortgages issued by the lender to housing agency recommended borrowers. Policies purchased by the housing agency may be invested in Stable Value Asset Funds (SVAF) designed to yield a certain number of basis points over LIBOR. For example, SVAFs may yield 100-150 basis points over LIBOR.

Method 200 may include receiving payment from a financial product provided to the party 210. For example, a party, such as a housing agency, may use excess earnings on the investment to reimburse the lender for the defaults suffered in the mortgage pool. Specifically, the agency may utilize withdrawals from earnings on the COLI policies to reimburse any defaults. Additionally, a housing agency may apply any death benefits paid for defaults or otherwise unpaid mortgage balances. The housing agency may retain the excess earnings not used to reimburse the defaults to fund the housing agency's operations. It is further contemplated that a housing agency may receive income from the policies in accordance with the agency's ability to approve mortgagors that do not default. In an embodiment of the invention, income may be the cash value of an insurance policy or financial product provided to a housing agency.

Method 200 may include providing loans for sale to at least one government sponsored enterprise (GSE) 212. Loans sold to GSEs may be individual mortgage loans, whole loans, or bundled loans, which may be a collection of a plurality of individual mortgage loans into a single investment package suitable for sale to a GSE. Lender may assemble a collection of mortgages with substantially similar terms and package them in to a single unit. For example, lender may collect $100 million of mortgage loans originated by lender and set for a certain term. Collected loans may be sold as whole loans or placed in a single investment package, and investment package may carry a fixed interest rate. GSEs may refer to a group of financial services corporations created by the United States Congress that may be government owned or publicly owned. The function of a GSE is to reduce interest rates for specific borrowing sectors of the economy, farmers, and homeowners. GSEs may also need to satisfy governmental requirements, including providing a certain amount of affordable housing. Specifically, GSEs may be bound by rules similar to the CRA, requiring these enterprises to allot a certain percentage of their assets toward providing affordable housing. As such, a lender may provide individual mortgages to GSEs such as Fannie Mae, Freddie Mac the Federal Home Loan Banks, the Government National Mortgage Association, or like institutions dedicated to providing affordable housing in accordance with governmental guidelines.

A GSE may create a secondary market for mortgages through securitization so that the primary market debt issues can be bought and traded by investors. Specifically, a GSE may purchase one or more mortgages from the lenders who originate them. A GSE may hold some mortgages, and some may be securitized, or sold in the form of securities which the GSE may guarantee. A secondary market may enable a lending institution to remove undesired credit risks from its balance sheets and provide securitized securities for investors. GSEs may be desirous to purchase LMI mortgages to satisfy affordable housing goals set by the government. Advantageously, a GSE may not have to assume a first loss position on LMI mortgages purchased, but may be provided with a continuous supply of lower risk LMI mortgages by a lender. It is further contemplated that such a continuous supply of LMI mortgages may be provided to a GSE, allowing the GSE to meet its Affordable Housing goals as set forth by Congress.

Method 200 may be further comprised of receiving payments from the sale of mortgage loans to GSEs 214. Loans may be individual mortgage loans, whole loans or bundled loans. It is contemplated that loans may be sold to GSEs at a premium. Specifically, a lender may retain the excess coupon rate on qualified mortgages, and combine excess coupon rate with excess earnings on agency approved mortgage loans. Combined earnings may be utilized to fund interest expense on issued GICs. It is further contemplated that a lender may provide individual mortgage loans, whole loans or bundled loans to a non-GSE, and may provide individual mortgage loans to individual borrowers.

In an embodiment of the invention, method 200 may include forgiving repayment of all or substantially all of a loan made to a housing agency 216. It is contemplated that a lender may not directly receive repayment of a loan made to an NFP, but may receive income in an alternate manner that may allow a lender to shelter income generated from originating low-to-moderate income (LMI) mortgages. Interest income received from loan repayment is subject to taxation by the Internal Revenue Service. However, benefits received pursuant to a life insurance contract upon the death of a policy holder are generally not taxable to the beneficiary, allowing a lender, as the beneficiary of life insurance policies executed by a housing agency for individual borrowers to retain all of such income. Further, a policy holder may withdraw earnings from a life insurance policy tax free prior to the death of a policy holder so long as the total amount withdrawn does not exceed the basis amount of the policy. Generally, the basis amount may be defined as the total amount contributed by a policy holder. These withdrawals may provide funds for a housing agency to cover any expenditures that may arise from providing loans under the method 200, as well as provide ancillary benefits to individual borrowers that would not otherwise be available. Ancillary benefits may include temporary disability benefits, unemployment benefits and the like. Loan repayment may be forgiven in segments over a period of time or may be forgiven in its entirety at a single designated time.

Benefits of the method to a housing agency may include provision of a continuous stream of income to support not-for-profit housing agency LMI advocacy. Funding for foundation education and remediation programs may be provided that may in turn provide valuable financial information for participants. Funding may be provided to an organization to screen and approve suitable potential sub-prime borrowers. In this manner, decision making power may be shifted to an entity most capable of executing the fact specific inquiry needed prior to making a lending decision. Additionally, free or low cost mortgage cancellation protection may be provided to a homebuyer by the housing agency, allowing a family to remain in a home in the event of the untimely death of the primary income provider. Typically, LMI mortgagors are not provided with free mortgage cancellation protection, creating an additional cost for mortgagors if they choose to purchase mortgage cancellation protection. In some instances, mortgage cancellation protection is not available to these mortgagors, resulting in eviction if a family loses its primary source of income.

Figure 3A:
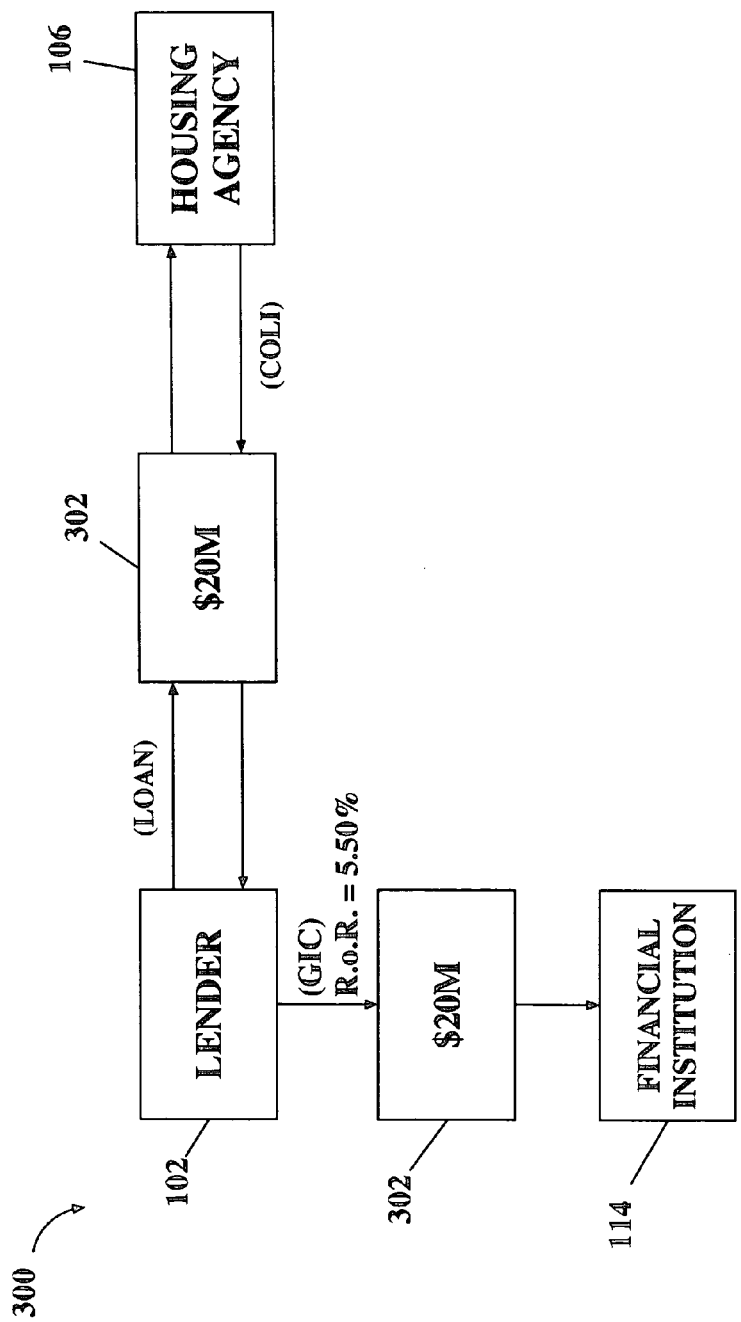

Referring to FIGS. 3A and 3B, an exemplary example 300 of method in accordance with the present invention is shown. Referring to FIG. 3A, in year one, lender 102 may make a collateralization pool loan to a not-for-profit housing agency 106 in the amount of $20 million 302. Lender 102 may in turn receive $20 million 302 in COLI investments from the housing agency 106. Lender 102 may sell Guaranteed Investment Contracts to at least one financial institution to finance the collateralization loan 114. The total value of these GICs may be $20 million 302. GICs may have a rate of return of 5.50 percent. The LIBOR rate may be 5.00 percent at the time of the transactions. FIG. 3B provides a table demonstrating an example of income that may be received by a lender from the GIC transaction. It is contemplated that all or substantially all collateralization loans be packaged loans and may be financed in the form of GICs. Additionally, all or substantially all individual loans may be sold to GSEs as qualified mortgages. In a further additional embodiment, individual loans may be packaged as mortgage backed securities and sold to either one or more GSEs and one or more non-GSE financial institutions.

Method 200 may be a computer implemented method for providing mortgage loans to higher risk borrowers. It is contemplated that steps of method 200 may be completed via a computing device having a hard drive capable of storing software for computing individual steps of the method 200. For example, execution of method steps may be accomplished via a series of user interactive graphic interfaces that allow a user to enter data and navigate between computer implemented steps of the invention. Computer implemented method may determine loan amount, mortgage amounts, policy amounts, interest amounts, investment and the like from input data that may be one of the these factors or any other criteria not specifically enumerated, calculate any one or more of the factors and provide a user with the results of such calculations.

An advantageous aspect of the method 200 of the present invention may be the elimination of a borrower's need to purchase mortgage insurance. The purchase of private mortgage insurance is often mandatory when a homebuyer cannot pay a certain percentage of a home's purchase price up front. For example, mortgage insurance may be necessary if a homebuyer cannot pay at least 20% of a home's purchase price up front. The expense of mortgage insurance may deter a potential LMI mortgage borrower from applying for a mortgage loan. However, it is contemplated that credit enhancement may be provided to a sub-prime mortgage pool, which may minimize the interest rate risk of the financial institution. Credit enhancement may also eliminate or substantially reduce a mortgage provider's requirement that a borrower purchase private mortgage insurance. It is contemplated that a method for funding community development initiatives may be provided to improve borrower credit. For example, funding initiatives may be provided that may minimize the credit risk to a participating financial institution. Additionally, participating financial institutions may receive a return on funds loaned to a housing agency. Further, a rate of return received by a financial institution may be competitive, or comparable to average rates of return at any given time providing incentive to increase loan amounts.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A non-transitory computer-readable storage medium with an executable program stored thereon, wherein the program instructs a microprocessor to perform the following steps:
   receiving funds from a financial institution, further including:
      selling a borrowing instrument to said financial institution in exchange for said funds;
   providing a first loan at a below market rate to a not-for-profit housing agency;
   providing a financial product responsive to a varying interest rate environment to said not-for-profit housing agency;
   requiring said not-for profit housing agency to invest the first loan proceeds in said financial product;
   providing a second loan for sale to a government sponsored agency;
   receiving payment from said financial product of said not-for-profit housing agency after an occurrence of a loan default;
   receiving payment from said government sponsored agency from providing said second loan; and
   forgiving repayment of said first loan to said not-for-profit housing agency.

2. The non-transitory computer-readable storage medium as claimed in claim 1, wherein said receiving funds from a financial institution include:
   receiving funds in exchange for a borrowing instrument.

3. The non-transitory computer-readable storage medium as claimed in claim 2, wherein said receiving funds in exchange for said borrowing instrument further includes:
   receiving funds in exchange for a guaranteed investment contract.

4. The non-transitory computer-readable storage medium as claimed in claim 1, wherein said providing a financial product to said not-for-profit housing agency for investment of proceeds of said first loan further includes:
   providing an insurance policy to said not-for-profit housing agency for investment of proceeds of said first loan.

5. The non-transitory computer-readable storage medium as claimed in claim 4, wherein said receiving payment from said financial product of said not-for-profit housing agency after an occurrence of a loan default further includes:
   providing payment from said financial product equating to a remaining balance of a defaulted loan.

6. The non-transitory computer-readable storage medium as claimed in claim 5, wherein said providing payment from said financial product of said not-for-profit housing agency after an occurrence of a loan default further includes:
   providing a cash value of said insurance policy.

7. The non-transitory computer-readable storage medium as claimed in claim 1, further comprising:
   receiving recommendations regarding borrowers from said not-for-profit housing agency.

8. A computer-implemented method for providing mortgage loans, comprising:
   receiving funds from a financial institution;
   providing a first loan to a not-for-profit housing agency;
   providing, via a processor, a financial product to said not-for-profit housing agency for investment of proceeds of said first loan;
   providing a second loan for sale to a government sponsored agency;
   receiving payment from earnings from said financial product from said not-for-profit housing agency after an occurrence of a loan default;
   receiving payment from said government sponsored agency from providing second loan; and
   forgiving, via a processor, repayment of said first loan to said not-for-profit housing agency.

9. The computer implemented method of claim 8, wherein said receiving funds from a financial institution further includes:
   receiving funds in exchange for a borrowing instrument.

10. The computer implemented method as claimed in claim 9, wherein said receiving funds in exchange for said borrowing instrument further includes:
    receiving funds in exchange for a guaranteed investment contract.

11. The computer implemented method as claimed in claim 8, wherein said providing a financial product to said not-for-profit housing agency for investment of proceeds of said first loan further includes:
    providing an insurance policy to said not-for-profit housing agency for investment of proceeds of said first loan.

12. The computer implemented method as claimed in claim 11, wherein said receiving payment from said financial product of said not-for-profit housing agency after an occurrence of a loan default further includes:
    providing payment from said financial product equating to a remaining balance of a defaulted loan.

13. The computer implemented method as claimed in claim 12, wherein said providing payment from said financial product of said not-for-profit housing agency after an occurrence of a loan default further includes:
    providing a cash value of said insurance policy.

14. The computer implemented method as claimed in claim 8, further comprising:
    receiving recommendations regarding borrowers from said not-for-profit housing agency.

* * * * *